J. P. WILLIAMS.
METHOD OF MAKING SOCKET MEMBERS OF SNAP FASTENERS.
APPLICATION FILED AUG. 16, 1911.
1,048,776. Patented Dec. 31, 1912.
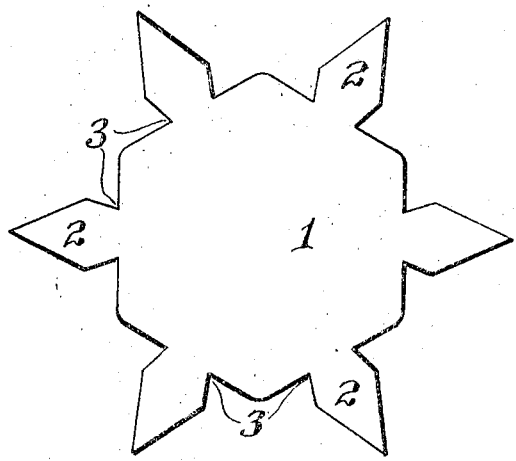
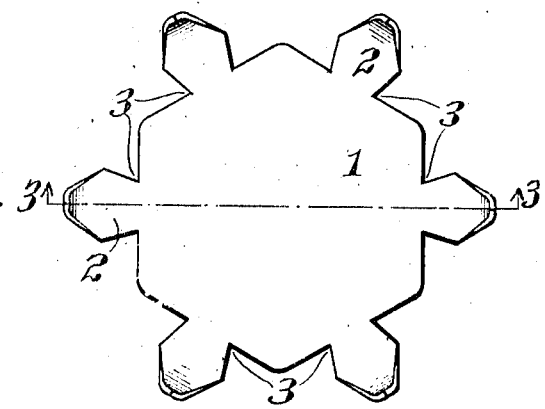
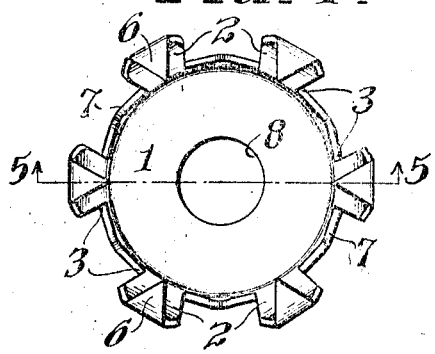
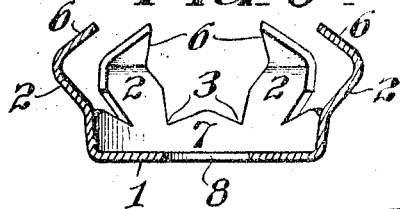
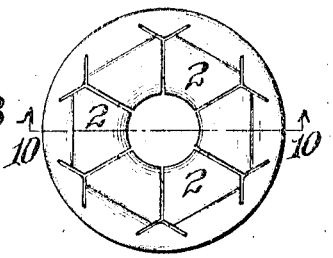
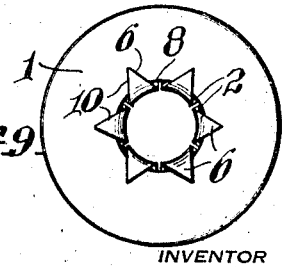
WITNESSES
INVENTOR
James P. Williams
By Cyrus N. Anderson
ATTORNEY

UNITED STATES PATENT OFFICE.

JAMES P. WILLIAMS, OF PHILADELPHIA, PENNSYLVANIA, ASSIGNOR TO THE DE LONG HOOK AND EYE COMPANY, OF PHILADELPHIA, PENNSYLVANIA, A CORPORATION OF PENNSYLVANIA.

METHOD OF MAKING SOCKET MEMBERS OF SNAP-FASTENERS.

1,048,776.　　　　　Specification of Letters Patent.　　Patented Dec. 31, 1912.

Application filed August 16, 1911. Serial No. 644,269.

*To all whom it may concern:*

Be it known that I, JAMES P. WILLIAMS, a citizen of the United States, residing in the city and county of Philadelphia, State of Pennsylvania, have invented a certain new and useful Method of Making Socket Members of Snap-Fasteners, of which the following is a specification.

My invention relates to improvements in the method of constructing the socket members of snap fasteners.

One of the objects of my invention is the provision of a method of constructing the socket member of a snap fastener whereby the same may be made from a single integral plate of suitable material with the parts of the said plate so arranged and related with respect to each other that the said socket member possesses not only the necessary resiliency and holding properties and qualities to enable it to coöperate satisfactorily and practically with the ball member of a snap fastener but will also possess the properties of strength, rigidity and neatness.

A further object of my invention is the provision of a method by the employment of which the construction of a socket member of a snap fastener is simplified and cheapened, so as to render it possible to furnish a strong, durable and efficient socket member at a minimum cost.

In the accompanying drawings, to which reference may be had for a clearer and more comprehensive understanding of my invention, I have illustrated the various steps which may be employed in the construction of a socket member of a fastener embodying my invention, but it should be understood that the shape or pattern of the plate from which the said member of the fastener is constructed and also that the steps as described herein may be varied within the scope of the claims without departing from my invention.

In the drawing,—Figure 1 is a plan view of a plate formed into a pattern or blank from which the socket member of the fastener may be constructed; Fig. 2 is a plan view of the same after the ends of the prongs or projections shown in Fig. 1 have been bent laterally; Fig. 3 is a transverse section on the line 3—3 of Fig. 2; Fig. 4 is a plan view of the said member showing the outer edge portion thereof turned at substantially right angles to the plane of the central portion of the plate; Fig. 5 is a transverse sectional view on the line 5—5 on Fig. 4; Fig. 6 is a top plan view of the socket member showing the upturned outer edge portion in Figs. 4 and 5 turned down into more or less proximity to the central portion of the plate with the ends of the prongs projecting through the central opening therein; Fig. 7 is a transverse sectional view on the line 7—7 of Fig. 6; Fig. 8 is a plan view of one side of a finished socket member of a fastener; Fig. 9 is a plan view of the opposite side thereof; and Fig. 10 is a transverse sectional view on the line 10—10 of Fig. 8.

In the construction of the socket member of a fastener in accordance with my invention, I take a plate of material cut or otherwise formed so as to be provided with projections which, after the plate has been bent and shaped to form the finished socket member of the fastener, constitute the spring acting parts thereof for engaging and holding the ball member of the fastener. Such a plate is illustrated in the drawings in which 1 designates the main or body portion thereof having projections 2 located at intervals around its peripheral edge. The said projections may be pointed as indicated in the drawings, the widest portions of said projections being situated a short distance from the points of connection thereof with the peripheral edge of the body portion 1 of the plate. Portions of the said projections and of the adjacent edge portion of the plate upon opposite sides of each of said projections are cut away to form notches 3 as illustrated. The portions of the edge of the plate 1 between the projections 2 project somewhat and preferably are rounded. However, it should be noted here that my invention is not limited to the shape or contour of the portions of the edge of the plate 1 between the projections 2 nor is it limited to the shape of the notches 3. As a matter of fact the notches 3 may be omitted but their presence is preferred in order to remove some of the excess of metal when the same is bent and turned inwardly toward the center of the plate in the formation of the socket member.

After the plate has been cut or otherwise formed into the shape illustrated in Fig. 1 the intermediate portions of the prongs are bent laterally as indicated at 5 and the ends of the said prongs are bent during the same operation into directions very nearly at right angles, as indicated in Fig. 3, to the plane of the central portion of the plate. By bending the ends of the prongs in the manner illustrated and described in the last preceding paragraph I am enabled to employ prongs of greater length than could be employed if the said ends were not so bent.

After the prongs have been bent or otherwise formed to the shape indicated in Fig. 3 of the drawings, the outer edge portion 7 of the plate 1 is bent laterally until it occupies an angular position with respect to the plane of the central portion of the said plate. The angularity of the edge portion 7 with respect to the plane of the plate may be varied, but most probably it usually will be at a right angle, or very nearly so, to the plane of said plate. The relative positions of the parts at this point in the manufacture of the socket member are illustrated in Figs. 4 and 5 of the drawing. Although the circular hole 8 at the central part of the plate 1 may be formed at any convenient time during the construction of the socket member of the fastener, I may form the same simultaneously with the bending up of the plate into the form shown in Figs. 4 and 5.

As a further step in the operation of constructing the socket member of the fastener according to my invention, the outer edge portion 7 and the projections 2 are bent down from the positions shown in Figs. 4 and 5 toward the central part of the plate 1 so that the points or portions 6 of the said projections extend through the socket hole or opening 8 as shown in Fig. 7. From the positions of the said parts as illustrated in Figs. 6 and 7 the edge portion 7 and the basal portions of the prongs 2 are brought into position nearer to the central portion of the plate 1 (which constitutes one side of the finished socket member) and the ends 6 of the said prongs 2 are bent over and around the edge of the hole 8 into the position indicated at 10 in Figs. 9 and 10 of the drawings.

By the employment of my new method of constructing the socket member of a fastener the ends of the projections 2 are bent and extended through and around the edge of the opening 8 in the central part of the plate 1 in such manner and relation to each other and to the edge of the said socket that they may yield outwardly for the purpose of permitting the insertion and withdrawal of the head or stud of the ball member of a fastener through the said socket. Furthermore by following my new method as above described the edges of the said prongs are brought into close relation with each other so that the completed member is neat in appearance and also so that the said projections coöperate with each other to increase the strength of the said member as well as the holding capacity of the said projections due to their spring action.

As illustrated and described the intervals between the projections 2 are of such extent that when the socket member of the fastener is completed the opposite edges of the said projections are in close contiguity with the result above stated, but it should be understood that my invention is not limited to a method in which the said projections are located in such definite relation with respect to each other. On the contrary the intervals between the said projections may be varied and of such extent that when the outer edge portion of the plate and the said projections are bent over into the positions shown in Figs. 9, 10 and 11, in which the outer ends of the prongs are bent over and around the edge of the hole 8 through the center of the plate 1, the edges of the said projections will not lie closely contiguous to or in contact with each other as is illustrated in the drawing but may be separated from each other by greater or less distances or intervals. It should also be understood that the shape or contour of the notches 3 may be varied as may be desired and as may be found practicable by manufacturers or others constructing socket members of snap fasteners according to my invention, and also that the shapes of the said projections may be varied.

Having thus described my invention, I claim:—

1. The method of making the socket member of a snap fastener which consists of forming a plate with projections extending radially from the periphery thereof and then bending the said projections over and inwardly upon said plate and extending their ends through an opening in the said plate.

2. The method of making the socket member of a snap fastener which consists in taking a plate of suitable dimensions having projections at intervals on its edge and bending the said projections laterally and inwardly into operative relation with respect to the said plate and extending the ends of said projections through an opening in the said plate and bending the same around the edge of said opening.

3. The method of making socket members of snap fasteners which consists in forming a plate with projections at oppositely disposed points on the peripheral edge of said plate and the said plate also having a central socket hole or opening therethrough and then bending the said projections laterally and inwardly toward the center of the said plate and projecting the ends thereof through the said socket hole or opening.

4. The method of making socket members of snap fasteners which consists in forming a plate with projections at oppositely disposed points on the peripheral edge of said plate and the said plate also having a central socket hole or opening therethrough and then bending the said projections laterally and inwardly toward the center of the said plate and projecting the ends thereof through the said socket hole or opening and bending the said projections around the edge of said hole or opening maintaining the inner surface of the bends in spaced relation to the edge of said hole or opening.

5. The method of making the socket members of snap fasteners which consists in forming a plate with radial projections at intervals upon the peripheral edge of said plate and said plate also having a socket hole or opening through its center and then bending the outer portion of the said plate and the said projections laterally and inwardly toward the center of said plate and into operative relation with respect thereto and extending the ends of the said projections through the said opening and around the edge thereof.

6. The method of making the socket members of snap fasteners which consists in forming a plate with projections on its peripheral edge and bending the ends of the said projections laterally and then bending the outer portion of said plate and said projections inwardly toward the center of the said plate and into operative relation with respect thereto and extending the ends of the said projections through the said hole or opening and bending the same around its edge.

7. The method of making the socket members of snap fasteners which consists in forming a plate with a central opening and radial projections at intervals upon the peripheral edge thereof and bending intermediate portions of the said projections laterally in one direction and the ends thereof laterally in the opposite direction and thereafter bending the outer portion of the said plate and the said projections laterally and inwardly toward the center thereof and extending the ends of said projections through said socket hole or opening and bending the same around the edge thereof and in spaced relation thereto.

8. The method of making the socket members of snap fasteners which consists of forming a plate of general circular outline with a socket hole or opening at its center and with projections extending radially from its peripheral edge and forming notches in the opposite edges of the said projections and in the adjacent portions of the edge of the said plate and thereafter bending the outer portion of the said plate and the said projections laterally and inwardly toward the center of the said plate and into operative relation with respect thereto and extending the ends of the said projections through the said hole or opening and bending the same around the edge thereof and in spaced relation with respect thereto.

In testimony that I claim the foregoing as my invention, I have hereunto signed my name this 15th day of August, A. D. 1911.

JAMES P. WILLIAMS.

In the presence of—
  Geo. H. Weidner,
  Carrie E. Kleinfelder.